United States Patent [19]

Hayashi

[11] Patent Number: 5,297,842
[45] Date of Patent: Mar. 29, 1994

[54] LINING FOR INTERIOR OF STRUCTURAL BODY AND METHOD OF PRODUCING SAME

[75] Inventor: Yoshihisa Hayashi, Tarui, Japan
[73] Assignee: Ikeda Bussan Co., Ltd., Ayase, Japan
[21] Appl. No.: 20,703
[22] Filed: Feb. 22, 1993

[30] Foreign Application Priority Data

Feb. 28, 1992 [JP] Japan .................................. 4-079199
May 25, 1992 [JP] Japan .................................. 4-158663

[51] Int. Cl.$^5$ .............................................. B62D 25/00
[52] U.S. Cl. .................................. 296/146.7; 52/222; 52/311.1; 156/260
[58] Field of Search ................. 296/146 D, 39.1, 39.3; 52/222, 311.1, 311.2, 811

[56] References Cited

U.S. PATENT DOCUMENTS

| | | | |
|---|---|---|---|
| 2,334,811 | 11/1943 | Detrick | 52/311.1 |
| 2,349,139 | 5/1944 | Bolen et al. | 52/311.1 |
| 3,817,015 | 6/1974 | Frangos | 52/222 |
| 4,779,390 | 10/1988 | Repper et al. | 52/222 |
| 5,076,870 | 12/1991 | Sanborn | 296/146 D X |

Primary Examiner—Robert R. Song
Attorney, Agent, or Firm—Foley & Lardner

[57] ABSTRACT

A lining for an interior portion of an automotive vehicle door. The lining comprises a lining base panel including a base material, and a first skin material laminated to the base material. The lining base panel is partitioned into a plurality of contiguous surface areas by at least one groove. At least one of the surface areas serves as an installation section. At least one decorative member is bonded to the lining base panel and includes at least one rigid base panel formed in a shape corresponding to the installation section, and at least one second skin material covering the base panel. The decorative member is formed at its peripheral section with a flange which is tightly fitted in the groove of the lining base panel. The flange including the rigid base panel. The above lining is produced by a method comprising the following steps: (1) setting a base material onto a first die of a pressing die, the base material being partitioned into a plurality of contiguous surface areas by at least one groove, at least one of the surface areas serving as an installation section; (2) setting a decorative member onto a second die of the pressing die, the second die facing the first die, the decorative member including a rigid base panel formed in a shape corresponding to that of the installation section, and a first skin material covering the rigid base panel, the decorative member being formed at its peripheral section with a flange including the rigid base panel; (3) providing bonding means for bonding the base material and the decorative member; (4) inserting a second skin material between the base material and the decorative member when the pressing die is opened; (5) pressing the second die onto the first die so that the decorative member is pressed through the second skin material onto the base material in a manner that the flange of the decorative member is tightly fitted in the groove of the base material, together with the second skin material, and the decorative member is bonded to the base material with the bonding means.

6 Claims, 4 Drawing Sheets

LINING FOR INTERIOR OF STRUCTURAL BODY AND METHOD OF PRODUCING SAME

BACKGROUND OF THE INVENTION

1. Field of the Invention

This invention relates to a lining or interior material suitable for a structural body such as a door trim of an automotive vehicle, and to a method of producing such a lining with simple production process and apparatus.

2. Description of the Prior Art

A variety of door trims or linings for the interior portions of an automotive vehicle have been proposed and put into practical use. A typical one of them is disclosed in U.S. Pat. No. 4,779,390. The conventional door trim or lining 1 in the U.S. Pat. is shown in FIG. 8 of the drawings of the present application. The lining 1 includes a lining base panel 2 which is formed by laminating a skin material 4 on the surface of a foundation panel 3. The lining base panel 2 is partitioned into contiguous surface areas by a groove 5. One of the surface areas is surrounded by the groove 5. A web 7 different in material from the skin material 4 is bonded to the surrounded surface area. The peripheral section 7A of the web 7 is forced into the groove 5 and fastened there, thus forming a decorative section of which periphery is defined by the groove 5. The skin material 4 is, for example, an artificial leather, while the web 7 is, for example, a cushioning material such as fibrous woven cloth or non woven cloth. The web 7 is fixed in position when forced into the groove 5 by virtue of restoration force due to the cushioning ability and thickness of the web 7.

However, difficulties have been encountered in the above conventional lining 1 as set forth below. If the width of the peripheral section 7A of the web 7 is larger than the depth of the groove 5, wrinkles due to slackening of the web 7 are unavoidably produced. If the same width is smaller than the same depth, fixation of the peripheral section 7A of the web 7 is insufficient only under the above restoration force due to thickness and the like, so that there is the possibility of the web peripheral section 7A being get out of the groove 5. Therefore, it is required to precisely regulate the depth and width of the groove 5, the thickness of the web 7 and the width of the peripheral section 7A of the web 7.

Additionally, since the web 7 has the cushioning ability as mentioned above, the web 7 has a thickness to some extent and therefore a step-like portion is formed between the lining base panel 2 and the decorative section (7). Further, a suitable jig is necessary in order to install the web 7 to the lining base panel 2. In this connection, in case of forming two or more decorative sections, two or more webs 7 must be installed respectively by two or more jigs, thereby making production of such the lining very troublesome.

SUMMARY OF THE INVENTION

It is an object of the present invention to provide an improved lining for the interior portion of a structural body, and an improved method of producing the same lining, by which drawbacks encountered in the conventional similar ones can be effectively overcome.

Another object of the present invention is to provide an improved lining for the interior portion of a structural body, and an improved method of producing the same lining, by which a decorative section is tightly fastened to a lining base panel without causing the possibility of the decorative section being got out of the lining base panel, while effectively preventing formation of wrinkles of the decorative section and/or gap around the decorative section.

An aspect of the present invention resides in a lining for an interior portion of a structural body, comprising a lining base panel including a base material, and a first skin material laminated to the base material. The lining base panel is partitioned into a plurality of contiguous surface areas by at least one groove. At least one of the surface areas serves as an installation section. At least one decorative member is bonded to the lining base panel and includes at least one rigid base panel formed in a shape corresponding to the installation section, and at least one second skin material covering the base panel. The decorative member is formed at its peripheral section with a flange which is tightly fitted in the groove of the lining base panel. The flange including the rigid base panel.

Another aspect of the present invention resides in a method of producing a lining for an interior portion of a structural body, comprising the following steps in the sequence set forth: (1) setting a base material onto a first die of a pressing die, the base material being partitioned into a plurality of contiguous surface areas by at least one groove, at least one of the surface areas serving as an installation section; (2) setting a decorative member onto a second die of the pressing die, the second die facing the first die, the decorative member including a rigid base panel formed in a shape corresponding to that of the installation section, and a first skin material covering the rigid base panel, the decorative member being formed at its peripheral section with a flange including the rigid base panel; (3) providing bonding means for bonding the base material and the decorative member; (4) inserting a second skin material between the base material and the decorative member when the pressing die is opened; (5) pressing the second die onto the first die so that the decorative member is pressed through the second skin material onto the base material in a manner that the flange of the decorative member is tightly fitted in the groove of the base material, together with the second skin material, and the decorative member is bonded to the base material with the bonding means.

Accordingly, the lining of the present invention is produced merely by pressing the decorative member through the skin material onto the base material forming part of the lining base plate, under the action of the pressing die. This largely facilitates the production of the lining. Additionally, the decorative member can be readily and securely fastened to the installation section of the lining base panel without formation of wrinkles or the like in the decorative member. Furthermore, a variety of materials can be used for the lining base panel and for the decorative member, while providing the lining superior in design. Moreover, jigs for installing the decorative members to the lining base panel can be unnecessary at all.

BRIEF DESCRIPTION OF THE DRAWINGS

In the drawings, like reference numerals designate like elements and parts throughout all the figures, in which.

DETAILED DESCRIPTION OF THE INVENTION

Figure 1:
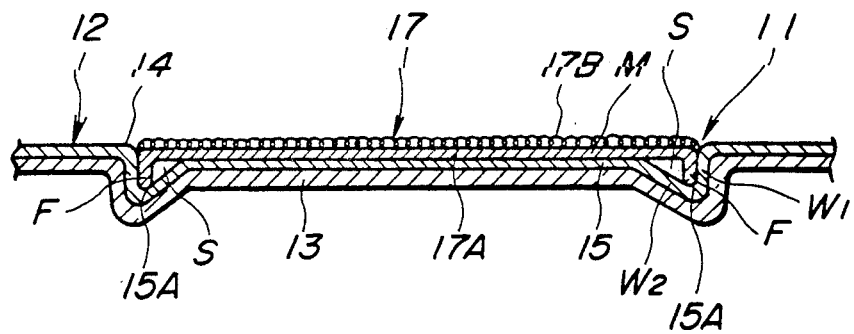
FIG. 1 is an enlarged sectional view taken in the direction of arrows substantially along the line I—I of FIG. 3, showing a first embodiment of a lining or door trim in accordance with the present invention.
Figure 2:
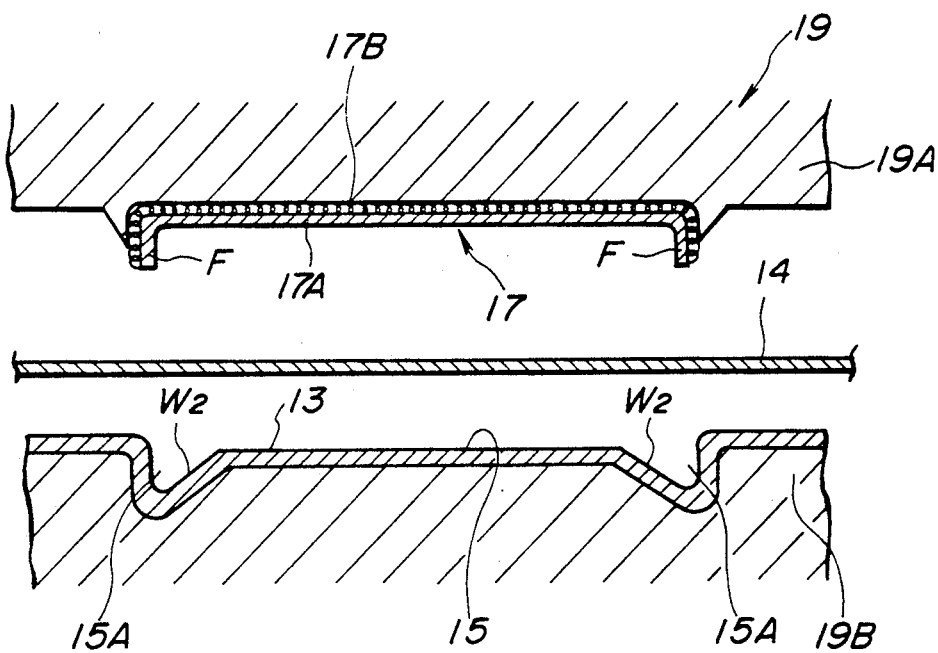
FIG. 2 is a fragmentary sectional view showing a process of producing the lining of FIG. 1.
Figure 3:
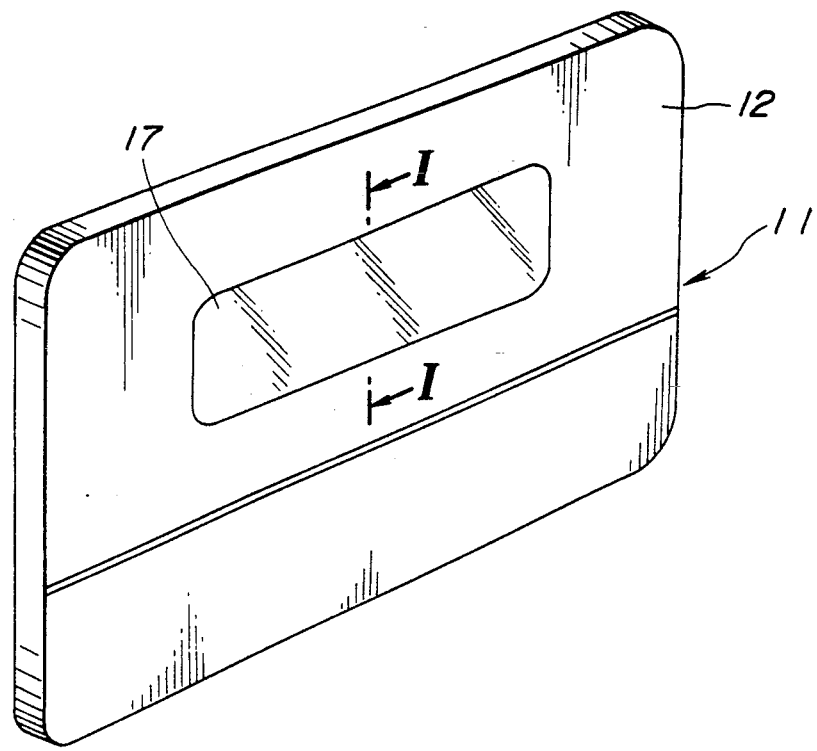
FIG. 3 is a perspective view of the lining of FIG. 1.

Referring now to FIGS. 1 to 3, and more specifically to FIG. 3 of the drawings, there is shown a first embodiment of a lining or door trim 11 of a door of an automotive vehicle (not shown). As shown in FIG. 1, the lining 11 includes a lining base panel 12 which is partitioned into two contiguous surface areas by a groove 15A. One of the surface areas is surrounded by the groove 15A and serves as an installation section 15 for a decorative member 17. The decorative member 17 is securely fastened to the installation section 15 of the lining base panel 12. The groove 15A is defined by a vertical wall W1 of the lining base material 12 and an inclined wall W2. The inclined wall W2 is integrally connected with the vertical wall W1 at an acute angle, thereby forming an escape space S which has a triangular cross-section as shown in FIG. 1. The lining base panel 12 includes a base material or panel 13 which is formed of a fibrous resin board produced by bonding fibers with a binder or resin such as phenolic resin, polyethylene, polypropylene or the like; plastic board; metal board; or the like. A skin material 14 is bonded on the surface of the base material 13 and formed of leather, artificial leather, fibrous woven fabric, or non woven fabric, or a laminated material of one of the aforementioned materials and one of plastic foamed material such as polyurethane foamed material, polyethylene foamed material or polypropylene foamed material.

The decorative member 17 includes a rigid base panel 17A formed of rigid plastic panel, rigid fibrous panel, metal panel or the like. A skin material 17B is covered on and bonded to the surface of the rigid base panel 17A. The skin material 17B is formed of a material similar to the skin material 14; however, it is preferable that the skin material 17B is different in material, color, color tone or the like from the skin material 14 from the point of view of design. The decorative member 17 is fabricated into the shape corresponding to that of the installation section 15, and formed at its peripheral section with a flange F. The flange F is integrally and vertically connected with a flat main body M of the decorative member 17. The flange F is tightly fitted in the groove 15A of the lining base panel 12. More specifically, the flange F is in tight contact with the vertical wall W1 of the lining base panel 12. Additionally, the rigid base panel 17A of the decorative member 17 is bonded to the skin material 14 of the lining base panel 12 with adhesive.

The aforementioned first embodiment lining 11 is produced as follows: As shown in FIG. 2, the decorative member 17 formed at its peripheral section with the flange F is set at a predetermined position of an upper die 19A of a pressing die 19 which includes a lower die 19B. The base material 13 is fabricated in such a predetermined shape as to form the installation section 15 surrounded by the groove 15A, and set at a predetermined position of the lower die 19B. The above setting of the decorative member 17 and the base material 13 is made when the pressing die 19 is being opened. At this time, a solvent type adhesive (in which an adhesive component solved in a solvent) (not shown) is coated onto the lower surface of the rigid base panel 17A of the decorative member 17, while an emulsion type adhesive (in which an adhesive component is emulsified) (not shown) is coated on the upper surface of the base material 13 of the lining base panel 12. Then, the skin material 14 is inserted between the decorative member 17 and the base material 13. Thereafter, the pressing die 19 is closed so that the decorative member 17 is pressed through the skin material 14 onto the base material 13. As a result, the decorative member 17, the skin material 14 and the base material 13 are laminated to each other to form the lining or door trim 11 as shown in FIG. 1.

In the thus formed lining 11, the flange F of the decorative member 17 is being inserted and fitted in the groove 15A of the lining base panel 12 in a manner that the flange F is in tight contact with the vertical wall 15B1 of the lining base panel 12, in which interference between the flange F and the wall of the groove 15A can be effectively prevented by virtue of the escape space S as shown in FIG. 1. Additionally, the decorative member 17 is bonded to the installation section 15 of the base material 13 with the adhesive, putting the skin material 14 between the decorative member 17 and the base material 13.

While the solvent type and emulsion type adhesives have been described as being coated respectively on the rigid base panel 17A and the base material 13, it will be appreciated that other adhesive may be coated to other parts for attaining the same purpose of bonding the decorative member 17 and the lining base panel 12.

In case that the upper die 19A is a so-called vacuum type capable of carrying out vacuum molding, a thermoplastic artificial leather such as polyvinyl chloride leather, or a laminated material such as that of the thermoplastic artificial leather and the plastic foamed material is selected as the skin material 14. In this case, the skin material 14 is heated to be put into its softened state, and subjected to the vacuum molding through the decorative member 17 by the upper die 19A, in which the skin material 14 is fastened to the rigid base panel 17A of the decorative member 17. Also in this case, the solvent type adhesive (not shown) is coated onto the lower surface of the rigid base panel 17A of the decorative member 17 before the skin material is put on the rigid base panel 17A, while an emulsion type adhesive (not shown) is coated on the upper surface of the base material 13 of the lining base panel 12. Then, the pressing die 19 is closed to laminate the decorative member 18 with the skin material 14 to the base material 13 of the lining base panel 12. At this time, air is blown from the upper die 19A to press the decorative member 17 onto the base material 13 of the lining base panel 13, while vacuum is developed at the lower die 19B so that the laminated lining 11 is brought into press contact with the lower die 19B under vacuum. Thus, the flange F of the decorative member 17 with the skin material 14 is tightly fitted in the groove 15A' of the base material 13 while the decorative member 17 is bonded to the base material 13 with the adhesives.

Figure 4:
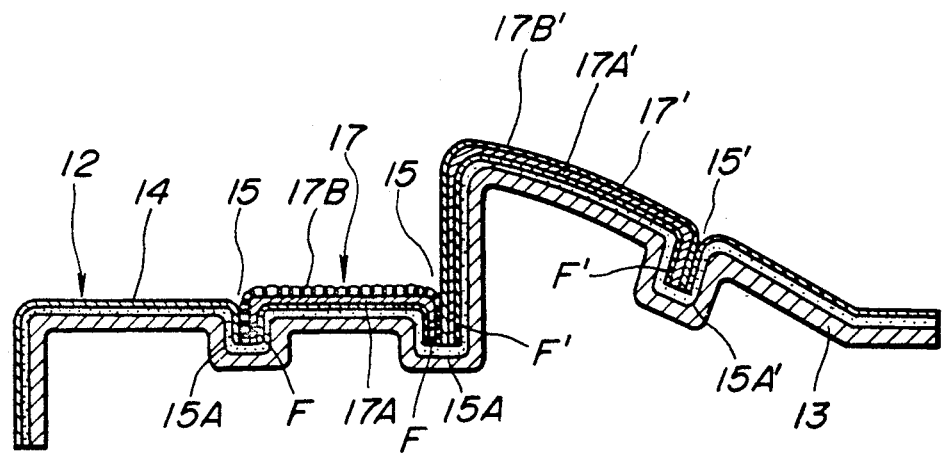
FIG. 4 is an enlarged sectional view taken in the direction of arrows substantially along the line IV—IV of FIG. 6, showing a second embodiment of the lining or door trim in accordance with the present invention.
Figure 5:
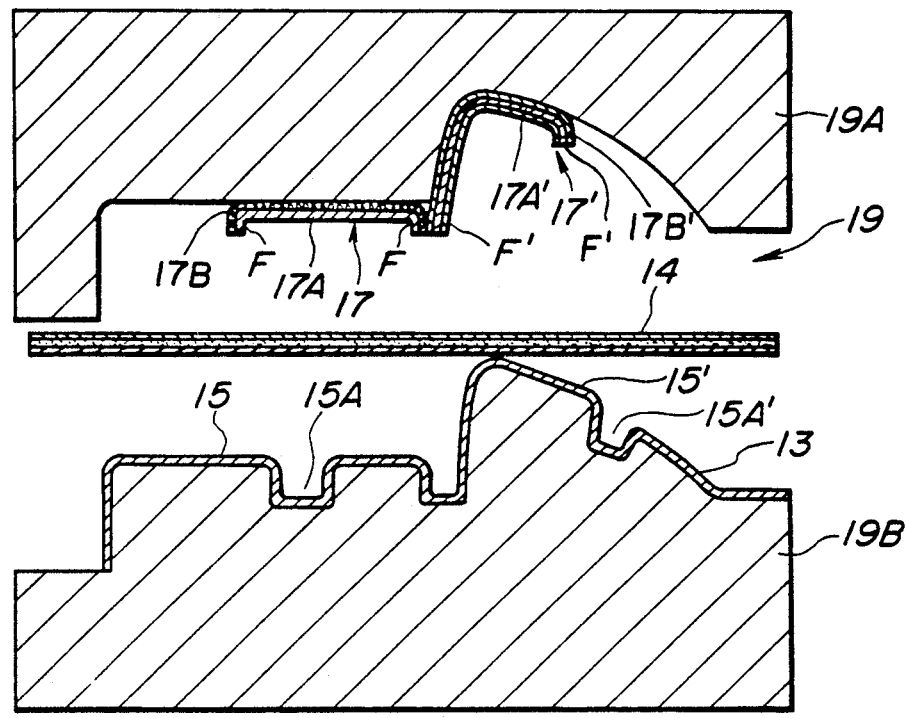
FIG. 5 is a fragmentary sectional view showing a process of producing the lining of FIG. 4.
Figure 6:
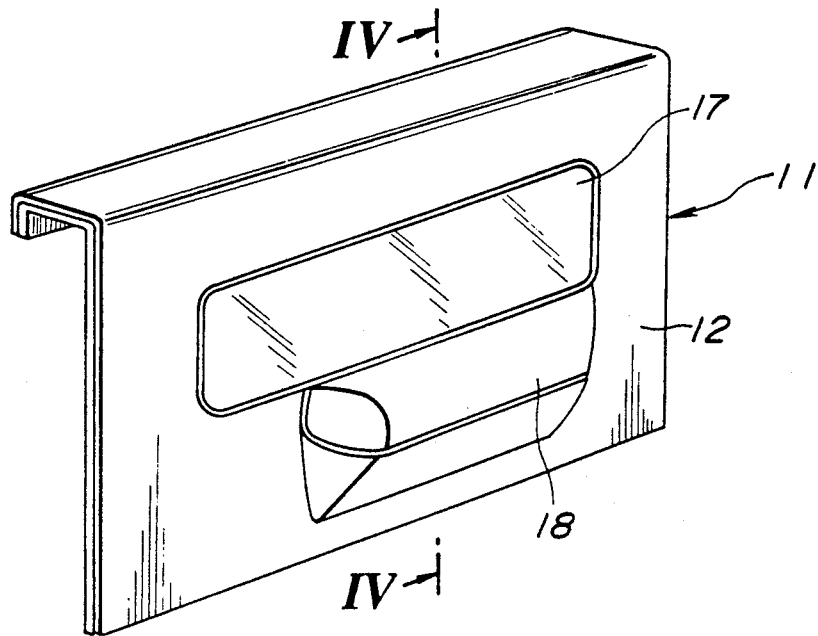
FIG. 6 is a perspective view of the lining of FIG. 4.

FIGS. 4 to 6 illustrate a second embodiment of the lining or door trim 11 of an automotive vehicle, in accordance with the present invention. The lining 11 of this embodiment shown in FIG. 6 comprises the lining base panel 12 which is partitioned into a plurality of contiguous surface areas by the grooves 15A, 15A', defining two installation sections 15, 15' at predetermined positions of the lining base panel 12. Two decorative members 17, 17' are securely fastened to the installation sections 15, 15', respectively. Each installation section 15, 15' of the lining base panel 12 is surrounded by the groove 15A, 15A' located at the peripheral section of the installation section 15, 15'.

The lining base panel 12 includes the base material 13 and the skin material 14 which are respectively similar in material to those in the first embodiment. The decorative member 17, 17' includes the rigid base panel 17A, 17A' and the skin material 17B, 17B' which are respectively similar in material to those in the first embodiment. The decorative member 17, 17' is formed into the shape corresponding to that of the installation section 15, 15', and formed at its peripheral section with the flange F, F'. The flanges F, F' are respectively inserted and fitted in the grooves 15, 15' of the lining base panel 12. At the installation section 15, 15', the rigid base panel 17A, 17A' of the decorative member 17 is bonded to the skin material 14 of the lining base panel 12 with the adhesives in the same manner as in the first embodiment.

In order to produce the second embodiment lining or door trim 11, first the decorative members 17, 17' having the respective flanges F, F' are respectively set at predetermined positions of the upper die 19A of the pressing die 19. The base material 13 of the lining base panel 12 (having the installation sections 15, 15' each surrounded by the groove 15A, 15A') is set at a predetermined position of the lower die 19B of the pressing die 19. The solvent type adhesive (not shown) is coated on the rigid base panels 17A, 17A' of the decorative members 17, 17', while the emulsion type adhesive (not shown) is coated on the base material 13. The skin material 14 is inserted between the decorative member 17 and the base material 13 of the lining base panel 12 under a state in which the pressing die 19 is being opened as shown in FIG. 5. Then, the pressing die 19 is closed so that the decorative members 17, 17', the skin material 14 and the base material 13 of the lining base panel 12 are laminated to each other thereby to form the lining or the door trim 11 as shown in FIG. 6.

Figure 7:
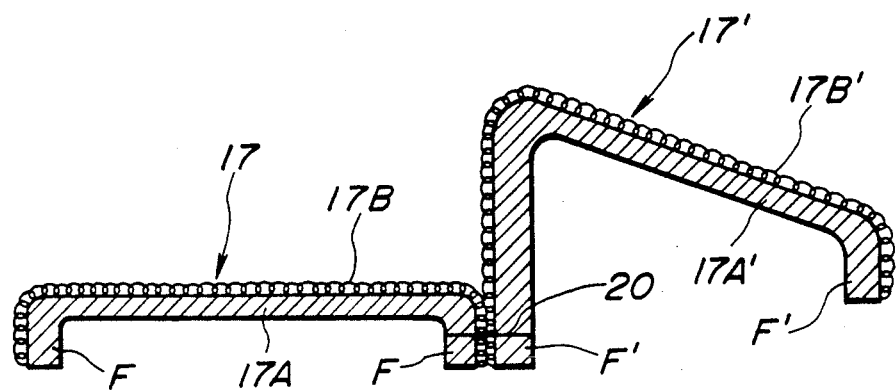
FIG. 7 is a sectional view similar to a part of FIG. 4 but showing a modified example of the second embodiment lining.
Figure 8:
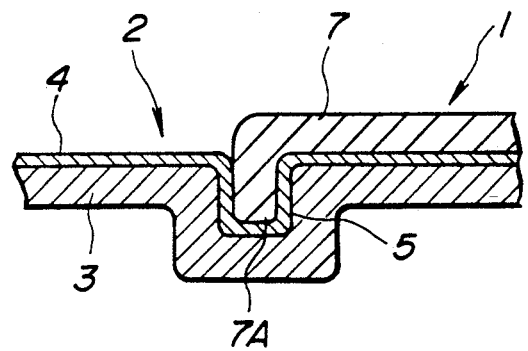
FIG. 8 is a fragmentary sectional view of a conventional lining of an automotive vehicle door.

In the thus formed lining 11, the flanges F, F' of the decorative members 17, 17' are inserted and fitted respectively in the grooves 15A, 15A' in the same manner as that in the first embodiment. Additionally, the rigid base panels 17A, 17A' of the decorative members 17, 17' are bonded through the skin material 14 to the base material 13 of the lining base panel 12 with the adhesives. In this embodiment, although the escape space as shown in FIG. 1 is not formed, it will be understood that the interference between the flange F, F' of the decorative member 17, 17' and the wall of the groove 15A, 15A' can be avoided by precisely carrying out positioning of the decorative member 17, 17'. It will be appreciated that the decorative members 17, 17' may be connected with each other with any connecting means 20 such as a tucker needle as shown in FIG. 7.

What is claimed is:

1. A lining for an interior portion of a structural body, comprising:

a lining base panel including a base material, and a first skin material laminated to said base material, said lining base panel being partitioned into a plurality of contiguous surface areas by at least one groove, at least one of said surface areas serving as an installation section; and at least one decorative member including at least one rigid base panel formed in a shape corresponding to said installation section, and at least one second skin material covering said base panel, said decorative member being formed at its peripheral section with a flange which is tightly fitted in said groove of said lining base panel, said flange including said rigid base panel, said decorative member being bonded to said lining base panel.

2. A lining as claimed in claim 1, further comprising means for bonding said decorative member to said lining base panel.

3. A lining as claimed in claim 1, wherein said decorative member includes a main body from which said flange perpendicularly extends, wherein said groove is defined by a vertical wall which is parallel and tightly contactable with said decorative member flange.

4. A lining as claimed in claim 1, wherein said rigid base panel is formed of one selected from the group consisting of rigid plastic panel, rigid fibrous panel, and metal panel.

5. A lining as claimed in claim 1, wherein said rigid base panel is bonded to said installation section of said lining base panel.

6. A lining as claimed in claim 1, wherein said structural body is a door of an automotive vehicle.

* * * * *